Sept. 3, 1957  L. D. TOTTEN  2,805,319
WELDING FRAME
Filed Aug. 27, 1956  4 Sheets-Sheet 1

LUTHER D. TOTTEN
*INVENTOR.*

BY Loyal J. Miller
ATTORNEY

Sept. 3, 1957  L. D. TOTTEN  2,805,319
WELDING FRAME

Filed Aug. 27, 1956  4 Sheets-Sheet 3

LUTHER D. TOTTEN
*INVENTOR.*

BY
ATTORNEY

Sept. 3, 1957     L. D. TOTTEN     2,805,319
WELDING FRAME

Filed Aug. 27, 1956     4 Sheets-Sheet 4

LUTHER D. TOTTEN
*INVENTOR.*

ATTORNEY ated Sept. 3, 1957

United States Patent Office 2,805,319
Patented Sept. 3, 1957

2,805,319

WELDING FRAME

Luther D. Totten, Wilmington, Calif.

Application August 27, 1956, Serial No. 606,452

8 Claims. (Cl. 219—101)

The present invention relates to apparatus for holding work to be flash or electrically welded, and more particularly to an apparatus for axially aligning and forcing the adjacent ends of two tubular members together with sufficient pressure to effect a flash weld.

The present invention is an improvement over my application now on file in the United States Patent Office, filed October 6, 1954, for Welding Frame, Ser. No. 460,669, now Patent No. 2,761,952, dated Sept. 4, 1956.

The principal object of the present invention is to provide an apparatus for flash welding the adjacent ends of tubular members.

A similarly important object is to provide a flash welding apparatus which features replaceable parts for flash welding a plurality of sizes of tubular members.

Another object is to provide an apparatus of this class which is designed to forcibly abut and flash weld the adjacent tubular ends of tube turns and flanges in addition to flash welding straight sections of tubular members thereto.

Another object is to provide a device of this character which will align and flash weld tube turns and flanges to sections of straight pipe.

The term "flash weld," as used herein, designates that type of welding which is accomplished by connecting a source of electrical energy to two oppositely disposed bodies of metal, of substantially equal cross sectional area, by means of suitable wiring, clamps, etc., and forcibly abutting the adjacent ends of the metal. With the proper amount of electrical current turned on, the two bodies are forced together with sufficient pressure so that the electrical current arcing between and heating the adjacent ends of the two bodies to a fusion temperature at the moment of contact "up-sets" a portion of the metal of the meeting ends and insures a fusion weld of the adjacent ends of the metal.

A need has been long recognized, in the welding industry, for a mechanical means having sufficient power to axially align and forcibly abut the adjacent ends of tubular goods, of diameters greater than two inches, to effect a flash weld. One such apparatus is disclosed in the above referred to pending application, but this device is limited primarily to straight sections of pipe, whereas the present invention anticipates the use of changeable die-blocks or holding means formed to grasp and forcibly abut adjacent ends of a variety of shapes of tubular members.

It is therefore another important object to provide a device of the above described character which has sufficient power to forcibly abut the adjacent ends of tubular members to effect a flash weld.

An additional object is to provide a device of this character having interchangeable members by which the device may be used for welding tubular members in the shop or for welding pipe in the field.

The present invention accomplishes these and other objects by providing an A-frame of rigid construction having a pair of spaced-apart parallel horizontal lower beams. A hydraulic cylinder having a vertically movable mandrel is centrally carried by the A-frame. Two pairs of clamps are removably connected to the beams in transversely aligned spaced-apart parallel relation below the mandrel and removably support die-blocks extending between the beams for holding tubular members to be welded. One of the die-blocks is movable toward the other die-block longitudinally of the beams within its supporting clamps. Sliding and pivoting linkage carried by the A-frame is actuated by downward movement of the mandrel to slide the movable die-block and forcibly contact the adjacent ends of tubular members to be welded.

Other objects will be apparent from the following description when taken in conjunction with the accompanying four sheets of drawings, wherein.

Like characters of reference designate like parts in those figures of the drawings in which they occur.

In the drawings.

Figure 1:
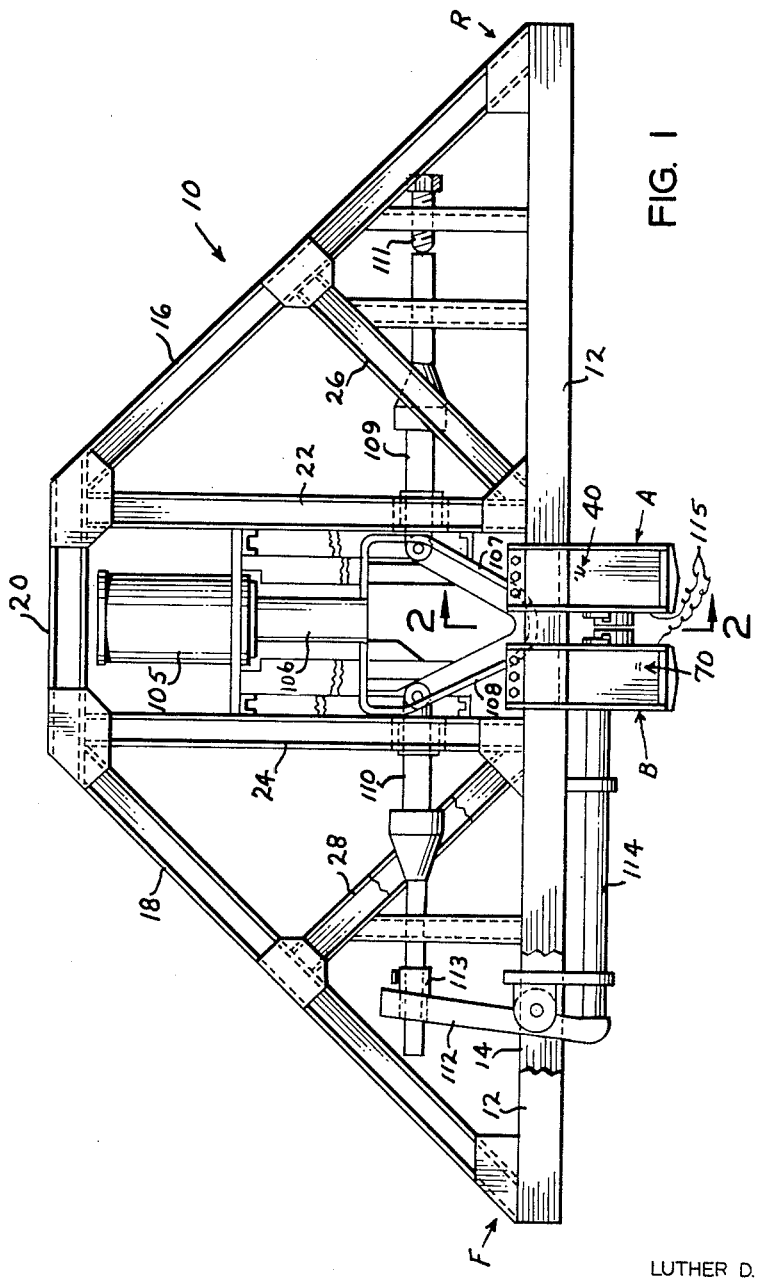
Figure 1 is an elevational side view of the apparatus in operative position.

The reference numeral 10 indicates, as a whole an A-frame of a selected size having two sides which support a pair of reinforced H-beams 12 and 14 in spaced-apart parallel relation. One side of the A-frame is shown in Fig. 1, and comprises the beam 12, two upwardly slanting stringers 16 and 18, and a horizontal header 20. Suitable I-beam vertical posts 22 and 24 are extended between the beam 12 and the header 20, and suitable I-beam angular braces 26 and 28 are also provided to further strengthen the entire side. The various elements (12 through 26) are rigidly connected at their points of juncture, as by welding or riveting. The opposite side member, not shown, connected to the beam 14 is preferably identical in construction to the above described side member and is held in spaced parallel relation therewith by suitable transverse cross bracing, not shown.

Figure 2:
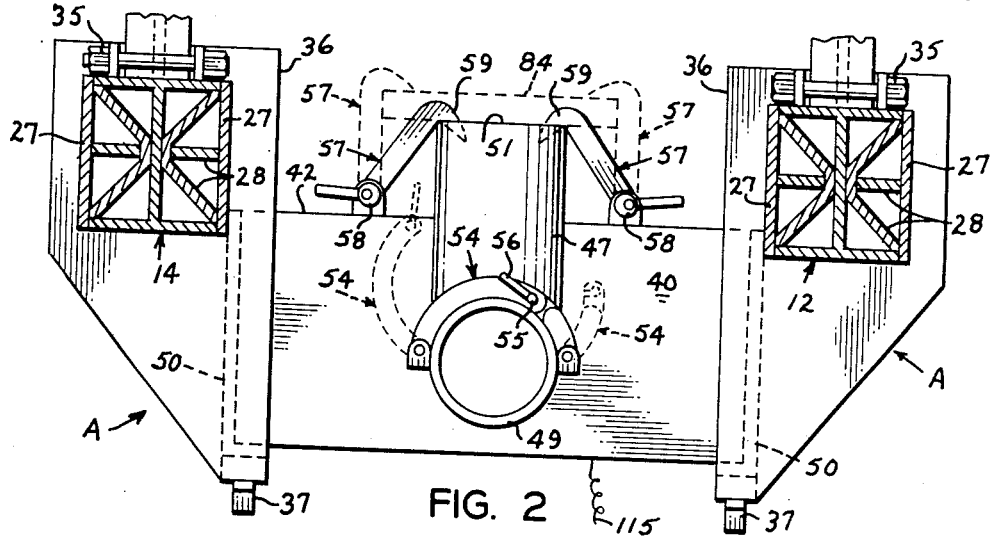
Figure 2 is a front elevational view, partly in section, taken substantially along line 2—2 of Fig. 1.

As seen in Fig. 2, the H-beams 12 and 14 are of larger dimensions than the associated I-beam bracing structure and are reinforced throughout their entire length by side plates 27 and cross bracing 28. For descriptive purposes, the letters F and R indicate the forward and rearward ends, respectively, of the A-frame.

Figure 4:
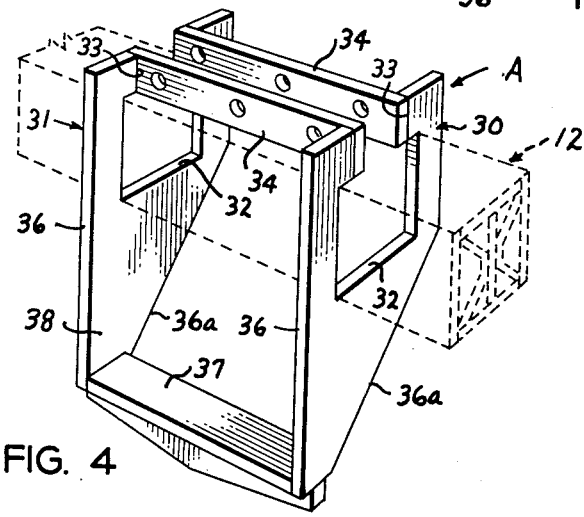
Figure 4 is a perspective view of one of the beam clamps, the beam being shown in dotted lines.

Four clamps, comprising two pairs of supports or clamps A and B, respectively, are removably connected to the beams 12 and 14 intermediate their ends. One of the clamps A is shown in detail in Fig. 4, and comprises a pair of substantially rectangular plates 30 and 31 vertically disposed edgewise in perpendicular relation to the beam 12. Transversely each of the plates 30 and 31 are of a width to extend laterally from each side of the beam 12 and lengthwise extend above and below the beam. Adjacent their upper ends the plates 30 and 31 are each alignedly perforated with a rectangular opening 32 for co-operatingly engaging the exterior surfaces of the beam 12. The uppermost ends of the plates 30 and 31 each have an opening 33 communicating with the perforation 32. Horizontally disposed bars 34 are rigidly connected to each of the plates within the openings 33 and act to hold the plates in spaced-apart parallel relation. The width of the opening 33, and the spacing between the bars 34, is slightly greater than the width of the I-beam supporting posts and braces. Thus, the clamps may be slid longitudinally along the beams 12 and 14, respectively, to the desired location and facilitates the removal of the clamps from either end of the beams by simply removing the bolts 35. Each of the bars 34 are transversely alignedly perforated to receive clamping bolts 35 (Fig. 2) for rigidly positioning each clamp on the respective beam. Each plate 30 and 31 has one vertical edge 36 disposed inwardly of the frame. The opposite edge of each plate 30 and 31 extends vertically downward to a point just below the lower surface of the beam and is then slanted inwardly and downwardly toward the bottom of the plates, as at 36a (Fig. 4). A reinforced support bar 37 extends horizontally between and is rigidly connected to the lowermost end of each of the plates 30 and 31. Thus, the inwardly extending edges 36 of the plates form, in co-operation with the support bar 37, an upwardly and laterally inwardly opening support pocket or socket 38 (Fig. 4), for the purposes which will presently be apparent. The clamps A are connected to the beams 12 and 14, respectively, with the sockets 38 disposed inwardly in co-operatingly aligned relation transversely of the beams. The clamps B, which are identical in construction with respect to the clamps A, are similarly connected to the beams 12 and 14 in parallel spaced-apart relation and between the clamps A and the forward end of the frame. The clamps A and B are shown disposed centrally of the beams, but it is to be understood that this is for illustrative purposes only, since they may be located at any desired point intermediate the ends of the beams.

Figure 3:
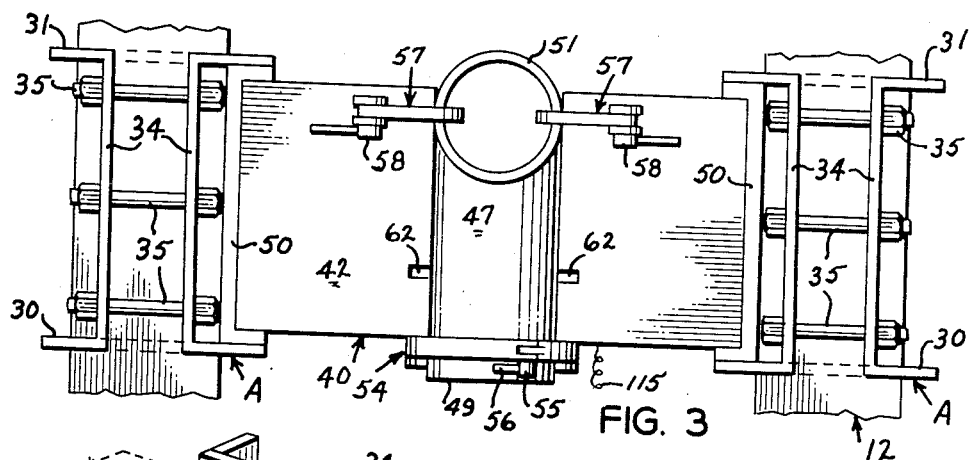
Figure 3 is a top view of the device, as shown in Fig. 2.
Figure 7:
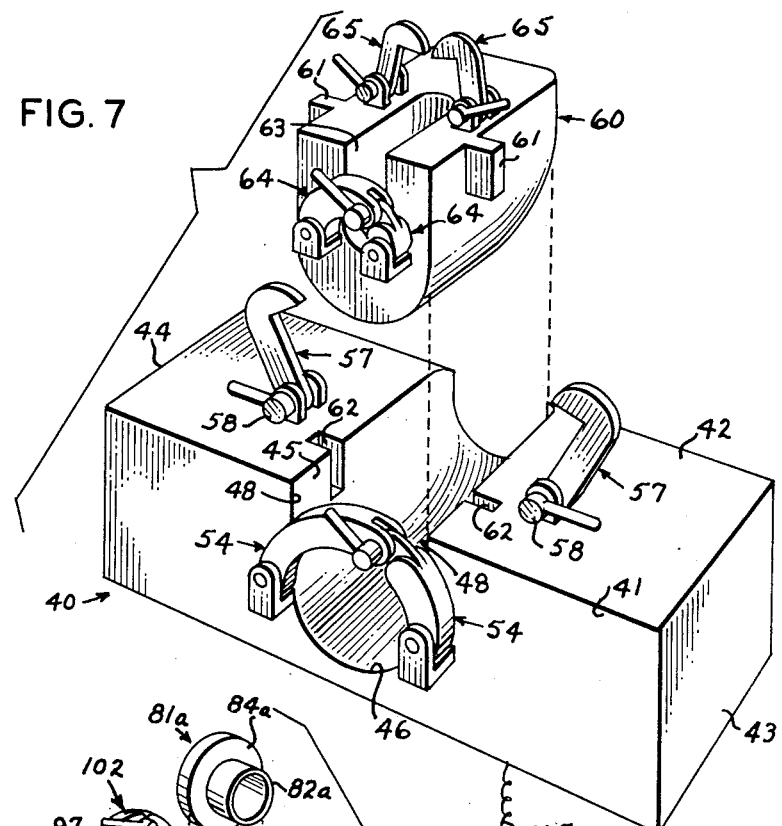
Figure 7 is an exploded perspective view of tube turn holding die-block and its associated bushing; and, Figure 8 is an exploded perspective view of the weld neck flange and pipe holding other die-block and its associated bushing, with one flange being shown in solid lines in exploded position, and one flange in welding position, as shown by dotted lines.

Referring now more particularly to Figs. 2, 3 and 7, the reference numeral 40 indicates, as whole, a rectangular die-block having a vertical forward face 41, horizontal top surface 42, and parallel ends 43 and 44. The ends 43 and 44 are adapted to be received within the respective sockets 38 of the clamps A, thus disposing the die-block 40 horizontally between the beams 12 and 14 with the plane of the top surface 42 in substantial alignment with the lower surface of the beams. Suitable electrical insulation 50 is placed around each end portion 43 and 44 within the sockets 38 to electrically insulate the die-block 40 from the frame 10, for the purposes more fully disclosed hereinbelow. Centrally the die-block 40 is provided with a transverse recess 45 in alignment with the longitudinal axis of the beams. The configuration of the recess is such that the arcuate substantially semi-circular surface 46 defining the lowermost part of the recess contiguously contacts a peripheral portion of an elbow or tube turn 47 (Figs. 2 and 3). The side wall 48 defining the sides of the recess 45 are perpendicular, thus permitting vertical insertion or removal of the tube turn 47 (Fig. 7) from the recess. Transversely and vertically the die-block 40 is of such size that the horizontally disposed end 49 (Fig. 3) of the tube turn projects forwardly of the die-block face 41, while the upwardly disposed end 51 (Fig. 2) of the tube turn projects above the upper surface 42 of the die-block, for purposes which will presently be apparent.

A pair of arcuate clamps 54 (Figs. 2 and 3), having an inner radius complemental with the periphery of the tube turn 47, are pivotally connected to each side, respectively, of the forward face 41 of the die-block 40 for gripping the forwardly projection portion of the tube turn in co-operation with the arcuate surface 46 (Fig. 7) of the recess. The clamps 54 are removably connected together by a transverse eccentric pin 55 (Figs. 2 and 3), manually rotatable by a handle 56, for applying tension to the periphery of the tube turn. The tube turn 47 is further anchored within the recess 45 by a pair of hook-shaped clamp arms 57 pivotally connected at one end by eccentric pins 58 to the top 42 of the die-block 40 on each respective side of the recess 45. The length of the clamp arms 57 is such that the hooked end 59 may be manually engaged over the upwardly disposed end 51 of the tube turn. Manual rotation of the pins 58 tensions the hooked end 59 of said clamp arms against the upper end 51 of the tube turn.

Figure 5:
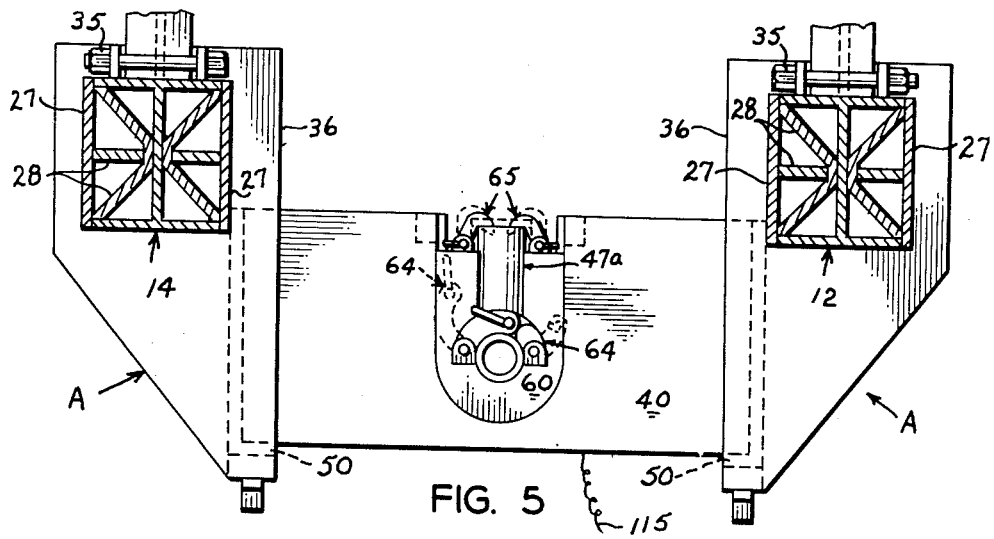
Figure 5 is a view similar to Fig. 2, illustrating the arrangement of alternate parts of the device.
Figure 6:
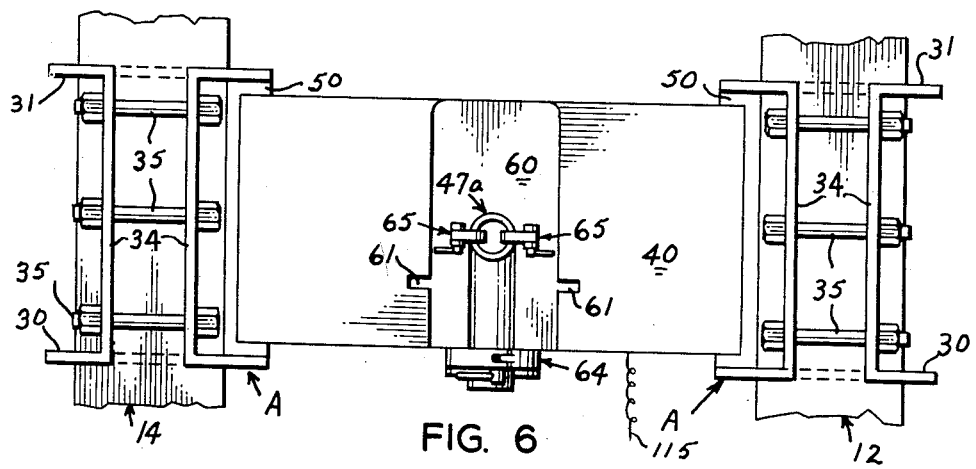
Figure 6 is a top view of the device, as shown in Fig. 5.

When it is desired to hold a tube turn 47a of smaller diameter than the tube turn 47, bushings are provided for removable insertion into the recess 45. One such bushing is indicated by the numeral 60 (Figs. 5, 6 and 7). Exteriorly the lower surface and sides of the bushing are adapted to be contiguously received by the recess 45. A pair of laterally extending lugs or ears 61, integrally carried by the bushing 60, are co-operatingly received by slots 62 formed in the die-block 40 to prevent longitudinal slippage of the bushing relative to the die-block during welding operations. The bushing 60 is provided with a central recess 63 (Fig. 7) of a desired size, similarly formed with relation to the recess 45. The bushing 60 is further provided with arcuate clamps 64 and clamp arms 65, similar with relation to the clamps 54 and clamp arms 57, for holding the small tube turn 47a in a similar manner.

Figure 8:
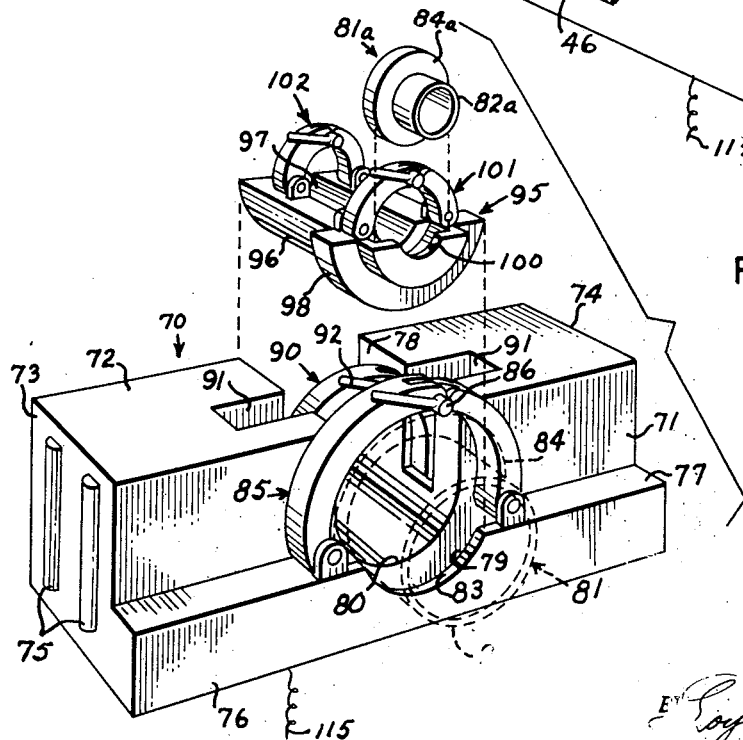

Referring now to Fig. 8, it may be seen that a second substantially rectangular die-block 70 has been provided having a vertical face 71, horizontal top surface 72, and parallel ends 73 and 74. The die-block 70 is supported transversely of the beams 12 and 14 by the clamps B by inserting the respective ends 73 and 74 within the sockets 38 of the clamps, with the face 71 disposed toward the rearward end R of the frame in parallel spaced-apart relation with respect to the forwardly disposed face 41 of the die-block 40. Vertically the die-block 70 is substantially equal with relation to the die-block 40. Transversely the die-block 70 is slightly narrower than the width of the sockets 38 of the clamps B to permit transverse movement of the die-block 70 longitudinally of the beams toward the die-block 40, for the reasons which will presently be apparent. Each end 73 and 74 of the die-block 70 is similarly electrically insulated from the clamps B by similar electrical insulation, not shown. Each end 73 and 74 is further provided with a pair of recessed vertically extending rollers 75 which prevent the die-block 70 from binding against the insulation or clamps B when the die-block is moved transversely. A longitudinally extending ledge 76, having a horizontal upper surface 77, is integrally carried by the lower portion of the die-block face 71. Centrally the die-block 70 and the upper surface 77 of the ledge is provided with a transverse recess 78 in axial alignment with relation to the recess 45 of the die-block 40. The upper surface 77 of the ledge is further provided with an enlarged arcuate slot-like recess 79 adjacent the die-block face 71 and concentric with the semi-circular portion 80 of the recess 78 for receiving a peripheral portion of the shoulder 84 of a weld neck flange 81. Thus, a horizontally disposed flange 81 will have a periphery portion of its circumferential shoulder 84 nested by the recess 79, while the vertically disposed face of the flange shoulder opposite the flange neck 82 is contiguous contact with the face 71 of the die-block. The neck portion 82 of the flange projects laterally of the die-block 70 toward the tube turn 47 and in axial alignment therewith. The neck portion 82 of the flange is shown in Fig. 8 as being cylindrical in general configuration and the recess edge 83 of the ledge 76 contiguously contacts a portion of the circumference of this neck. Some weld neck flanges feature a tapering or beveled exterior surface of the neck portion, and, when this type of flange is used, it seems obvious that the edge 83 may be formed with a beveled surface complemental with the beveled neck surface. The flange 81 is held within the recess 79 by a pair of arcuate clamps 85, similar to the clamps 84, pivotally connected to the surface 77 of the ledge on each respective side of the recess 79 which complementally contiguously contact the exposed peripheral portion of the flange shoulder 84. The clamps 85 are similarly joined by a hand operated eccentric pin 86 for gripping the flange shoulder 84.

When it is desired to weld a straight section of pipe to the forwardly presented end of the tube turn 47, a peripheral portion of the pipe is longitudinally received by the arcuate portion 80 of the recess 78. A pair of clamps 90, carried by the die-block 70 within slots 91 on opposite sides of the recess, co-operate with the semi-circular portion 80 of the recess to grip the pipe. These clamps 90 are similarly joined by a hand operated eccentric pin 92.

Bushings are provided for the recess 78 of the die-block 70 for holding a flange 81a or pipe of a smaller diameter, such as that disclosed by the tube turn 47a (Fig. 6). One such bushing is indicated by the numeral 95 in Fig. 8, and comprises a substantially semi-cylindrical body 96 having an inner longitudinal arcuate recessed surface 97 formed to contiguously nest a peripheral portion of the circumferential extent of the pipe or flange neck 82a. A substantially semi-circular shoulder 98, integrally carried by the bushing 95, is complementally received by the recess 79. The bushing 95 has an enlarged arcuate slot-like recess 100, similar to the recess 79, concentric with the recess 97 and aligned with the shoulder 98, for nesting a peripheral portion of the shoulder 84a of the flange 81a. Clamps 101 and 102, similar to the clamps 85 and 90, are carried by the bushing 95 for holding, in a similar manner, the flange 81a or a straight section of pipe.

As disclosed in the above referred to co-pending application, the frame 10 is further provided with a vertically disposed heavy duty hydraulic cylinder or ram 105 centrally carried between the vertical posts of the two sides of the frame (Fig. 1). The cylinder 105 has a vertically reciprocating mandrel 106 having downwardly and inwardly converging opposing faces 107 and 108. Push rods 109 and 110, preferably square in cross section area, are slidably carried horizontally by the respective rearward and forward end portions of the frame, and are slidably connected at one end to the respective slanting faces 107 and 108 of the mandrel. Vertical movement of the mandrel 106 reciprocates the push rods 109 and 110. Rearward movement of the push rod 109 is limited by the stop 111. A yoke-lever 112 is pivotally supported intermediate its ends between the beams 12 and 14 and extends above and below the same. The forward end of the push rod 110 is slidably received by the upper end portion of the yoke-lever 112 through a suitable perforation. An adjustable stop 113, carried by the push rod 110 in contact with the lever 112, pivots the same when the mandrel moves the push rod 110. Pressure rods, one of which is indicated by the numeral 114 Fig. 1, are horizontally slidably carried in depending relation below the beams 12 and 14. The opposing ends of the pressure rods 114 are in contact with the forwardly disposed side of the die-block 70 and the depending end of the lever 112, respectively. The rearward ends of the pressure rods are provided with a pad of non-conductive material to electrically insulate them from the die-block 70. Conventional electric wiring 115, from a source of electrical energy, not shown, is operatively connected to each of the die-blocks 40 and 70.

*Operation*

With the clamps A and B arranged on the A-frame 10, as shown in Fig. 1, and with the tube turn 47 and flange 81 in position within the respective die-blocks 40 and 70 and electrical current turned on, downward movement of the mandrel 106 moves the push rod 110 forwardly, pivoting the lower end of the lever 112 and the pressure rods 114 rearwardly to move the die-block 70 within the clamps B to forcibly abut the neck 82 of the flange against the forwardly presented end 49 of the tube turn 47 and effect a weld. The purpose of the push rod 109 and the stop 111 is to maintain the mandrel vertical during its downward movement and insure full travel of the push rod 110.

After the flange 81 has been welded to the tube turn 47, the tube turn may then be removed from the die-block 40 and inverted within the recess 45 so that the flange 81 extends upwardly above the top surface 42 of the die-block (Fig. 2). The end 51 of the tube turn is then disposed forward horizontally and is gripped by the clamps 54, and the hooked ends 59 of the clamp arms 57 are engaged over the flange shoulder 84. A straight section of pipe is received by the die-block 70, as disclosed hereinabove, and the adjacent ends of the pipe and tube turn are forcibly abutted by the downward action of the mandrel, as disclosed hereinabove, to effect a weld of the pipe to the tube turn 47. During this welding of the pipe section to the tube turn, it is preferred that the pressure rods 114 be placed in contact with the forward end of the pipe section to insure that sufficient pressure will be applied to the two bodies to effect the weld. This operation will require the use of substantially shorter pressure rods 114 or re-location of the clamps A and B.

Obviously tubular metallic goods of other configuration than that disclosed herein may be flash welded in a similar manner simply by providing die-blocks similar to those disclosed and which are provided with recesses and clamping means for receiving and holding such goods.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In an apparatus for axially aligning and flash welding the adjacent ends of tubular members, the combination with an A-frame of rigid construction having a pair of spaced-apart horizontal lower beams and having hydraulically actuated means for forcibly moving one of said members, of: a first pair of clamps rigidly connected to said beams intermediate their ends in transversely aligned relation; a first die-block extending between and removably carried by said first pair of clamps, said die-block having a centrally disposed recess for receiving one of said tubular members therein; a second pair of clamps rigidly connected to said beams in spaced-apart parallel relation with said first pair of clamps; a second die-block extending between and removably supported by said second pair of clamps, said second die-block having a centrally disposed recess for receiving the other one of said tubular members therein, said second die-block slidably supported by said second pair of clamps for transverse movement of said second die-block longitudinally of the beams; said hydraulic means operatively connected to said second die-block on the side opposite said first die-block for moving said second die-block and abutting the adjacent ends of said tubular members; clamping means carried by said first and second die-blocks for gripping the tubular members in co-operation with the recesses; and electric wiring connecting a source of electrical energy to said first and second die-blocks for flash welding the abutted ends of said tubular members.

2. Structure as specified in claim 1, in which said first and second die-blocks are electrically insulated from said first and second pair of clamps.

3. In an apparatus for axially alining and flash welding the adjacent ends of tubular members, the combination with an A-frame of rigid construction having a pair of spaced-apart horizontally lower beams and having hydraulically actuated means for forcibly abutting the adjacent ends of said members, of: a first pair of clamps rigidly connected to said beams intermediate their ends in transversely aligned co-operative relation; a first die-block extending between and removably supported by said first pair of clamps, said die-block having a centrally disposed recess for nesting a peripheral portion of one of said tubular members therein; a second pair of clamps rigidly connected to said beams in spaced-apart parallel relation with said first pair of clamps; a second die-block extending between and removably supported by said second pair of clamps, said second die-block having a centrally disposed recess in co-operative axial alignment with the recess in said first die-block for nesting a peripheral portion of the other one of said tubular members therein, said second die-block being slidably supported by said second pair of clamps for transverse movement of said die-block longitudinally of the beams; said hydraulic means operatively connected to said second die-block on that side opposite the first said die-block for moving said second die-block and forcibly abutting the adjacent ends of said tubular members; clamping means carried by the first and second said die-blocks for gripping and holding the tubular members in co-operation with the recesses; and electric wiring connecting a source of electrical energy to the first and second die-blocks for flash welding the abutted ends of said tubular members.

4. Structure as specified in claim 3, in which the first and second said die-blocks are electrically insulated from the first and second said pairs of clamps.

5. Structure as specified in claim 4, and a bushing removably carried by the recess of each respective die-block, said bushings having axially aligned centrally disposed arcuate recesses for receiving tubular members therein; and manually operated clamps hingedly connected to said bushings for gripping tubular members in co-operation with the recesses.

6. An apparatus for axially aligning and flash welding tubular members of metallic material, including: an A-frame of rigid construction having a pair of spaced-apart horizontal lower beams; a first pair of clamps removably connected rigidly to said beams intermediate their ends in transversely aligned co-operative relation, said first pair of clamps each having a socket disposed inwardly of the beams in co-operative aligned relation; a first die-block extending between and removably supported by the sockets of said first pair of clamps, said die-block having a centrally disposed recess for nesting a peripheral portion of one of said tubular members therein; a second pair of clamps removably connected rigidly to said beams in spaced-apart parallel relation with the said first pair of clamps, said second pair of clamps each having a socket disposed inwardly of the beams in co-operative aligned relation; a second die-block extending between and removably supported by the sockets of said second pair of clamps, said second die-block having a centrally disposed recess in co-operative axial alignment with the recess in said first die-block for nesting a peripheral portion of the other one of said tubular members therein, said second die-block being slidable longitudinally of the beams in the sockets of said second pair of clamps; a hydraulic cylinder rigidly supported vertically by the upper portion of said A-frame, said cylinder having a vertically movable depending mandrel, said mandrel having downwardly and inwardly converging faces on its lower end portion; a push rod slidably carried horizontally by the A-frame having one end thereof connected to the slanting surface of said mandrel for sliding said push rod longitudinally of the A-frame upon downward movement of the mandrel; a lever pivotally connected between said beams and extending above and below the same, the upper end of said lever being pivotally connected to said push rod for vertically pivoting the lever when the push rod is moved; pressure rods horizontally slidably carried in depending relation below said beams and extending between the lower end of said lever and the adjacent side of said movable die-block for moving said die-block and forcibly abutting the adjacent ends of tubular members carried by said first and second die-blocks; and electric wiring connecting a source of electrical energy to said first and second die-blocks for flash welding the abutted ends of the tubular members.

7. Structure as specified in claim 6, in which the first and second said die-blocks are electrically insulated from the first and second said pairs of clamps.

8. Structure as specified in claim 7, and a bushing removably carried by the recess of each respective die-block, said bushings having axially aligned centrally disposed arcuate recesses for receiving tubular members therein; and manually operated clamps hingedly connected to said bushings for gripping tubular members in co-operation with the recesses.

References Cited in the file of this patent

UNITED STATES PATENTS

| | | |
|---|---|---|
| 2,212,393 | Dalton | Aug. 20, 1940 |
| 2,761,952 | Totten | Sept. 4, 1956 |